United States Patent
Reed, Jr.

(10) Patent No.: US 7,625,413 B1
(45) Date of Patent: Dec. 1, 2009

(54) AGGLOMERATING ALUMINA DUST FOR ALUMINUM PRODUCTION

(76) Inventor: Thomas J. Reed, Jr., R.R. #1, Box 231A, Huntingdon, PA (US) 16652

(*) Notice: Subject to any disclaimer, the term of this patent is extended or adjusted under 35 U.S.C. 154(b) by 364 days.

(21) Appl. No.: 11/355,351

(22) Filed: Feb. 16, 2006

(51) Int. Cl.
*C22B 1/216* (2006.01)
*B29C 67/02* (2006.01)
*C25C 3/06* (2006.01)

(52) U.S. Cl. .............. 23/313 R; 205/372; 425/222
(58) Field of Classification Search ........... 425/222; 23/313 R; 205/372
See application file for complete search history.

(56) References Cited

U.S. PATENT DOCUMENTS

| | | | | |
|---|---|---|---|---|
| 3,535,412 A | * | 10/1970 | Driscoll | 264/117 |
| 4,075,067 A | * | 2/1978 | Bhilotra | 205/392 |
| 4,162,287 A | * | 7/1979 | Gunnell et al. | 264/117 |
| 4,502,858 A | * | 3/1985 | Kertok | 425/204 |
| 4,591,324 A | * | 5/1986 | Kubota | 425/222 |
| 4,698,190 A | * | 10/1987 | Shibata et al. | 264/410 |
| 5,124,100 A | * | 6/1992 | Nishii et al. | 264/82 |
| 5,296,177 A | * | 3/1994 | The et al. | 264/117 |
| 5,994,499 A | * | 11/1999 | Asano et al. | 528/502 R |
| 6,143,221 A | * | 11/2000 | Gurol | 264/118 |
| 7,449,030 B2 | * | 11/2008 | Robson et al. | 23/313 R |

* cited by examiner

*Primary Examiner*—Wayne Langel
(74) *Attorney, Agent, or Firm*—Gary P. Topolosky; Glenn E. Klepac

(57) ABSTRACT

Alumina-containing dust is agglomerated into granules by mixing the dust with an organic binder to form a mixture; feeding the mixture into a rotating drum; adding water to the mixture while the drum is rotating; stirring the mixture with a rotor hastening agglomeration of the dust particles into granules; collecting moist granules from an open end of the drum; and drying the moist granules. Granules produced by the process are suitable feedstock material for production of aluminum by electrolysis of alumina in a cell containing a molten salt bath, anodes, and a cathode.

11 Claims, 2 Drawing Sheets

AGGLOMERATING ALUMINA DUST FOR ALUMINUM PRODUCTION

1. FIELD OF THE INVENTION

The present invention relates the agglomeration of alumina-containing dust into granules that are a suitable feedstock material for electrolytic production of aluminum.

2. BACKGROUND OF THE INVENTION

Alumina trihydrate ($Al_2O_3.3H_2O$) is produced by the well known Bayer process and then heated in a multi-stage calciner to make smelting grade alumina (SGA) having low water content. Airborne dust produced during calcination is collected by means of electrostatic precipitators and in multi-cyclones and bag houses. The dust thereby collected is a very fine alumina having a particle size which varies considerably. Water content is low, generally less than about 3 wt %. Typically more than 90 wt % of the dust is in the form of particles less than 20 microns in size and the particles generally have a median size of less than about 5 microns. Because of its small particle size the dust is difficult to handle with equipment ordinarily used for feeding alumina into smelting cells. Accordingly it is impractical to add large amounts of dust directly into an electrolytic cell. Alumina-containing dust collected by electrostatic precipitators is sometimes called "ESP dust".

In the prior art several processes have been devised for agglomerating ESP dust into bodies suitable for addition to electrolytic cells for aluminum production. References relating to such processes include Bhilotra U.S. Pat. No. 4,075,067; Thé et al. U.S. Pat. No. 5,296,177; Boulanger U.S. Pat. No. 5,560,876; Hall et al. U.S. Pat. No. 5,858,325; and Robson et al. U.S. 2005/0118096. Disclosures of the Bhilotra, Thé, and Boulanger patents are incorporated by reference to the extent consistent with the present invention. Processes disclosed in the cited references are not in widespread industrial use at the present time because they rely upon expensive binding additives such as activated alumina or they are otherwise impractical to operate commercially. Accordingly there still remains a need for an efficient and economical process capable of agglomerating ESP dust into bodies suitable for addition to electrolytic smelting cells for producing aluminum.

A principal objective of the present invention is to provide a process and apparatus suitable for agglomerating alumina-containing dust into bodies suitable for addition to electrolytic smelting cells. A related objective of the invention is to provide an efficient and economical process for aluminum production utilizing alumina-containing dust as a starting material. An important advantage of the invention is that the process relies upon agglomerating the alumina-containing dust with addition of an inexpensive binder. Additional objectives and advantages of my invention will become apparent to persons skilled in the art from the following detailed description of a particularly preferred embodiment.

3. SUMMARY OF THE INVENTION

In accordance with the invention there is provided an apparatus for agglomerating alumina-containing dust into granules. The apparatus includes a rotating drum, an auger, a spray nozzle, and a rotor inside the drum. The drum has a closed end, an open end, and a side wall extending between the closed end and the open end. The auger includes a screw extending through the closed end. The screw feeds into the drum a mixture comprising alumina-containing dust and a binder. The mixture preferably enters into the drum below a top surface of a mixture bed inside the drum. The spray nozzle is preferably supported by a spray bar. The spray nozzle sprays water onto the mixture inside the drum to promote agglomeration of the mixture into granules. An electric motor or other rotating means rotates the drum about an axis extending between the closed end and the open end. The axis of rotation is adjusted by pivoting the drum on its base so that the axis may deviate from horizontal by as much as about 50°. The rotor includes a plurality of pins or rotor pins impelling the granules toward the mixture and hastening agglomeration into moist granules having increased size. The moist granules exit the drum via its open end. The moist granules are then dried, preferably by heating them to an elevated temperature greater than 100° C. by gas heating means. Suitable drying means include heating in a rotary kiln or in a fluidized bed, and spray drying.

The alumina-containing dust generally includes particles having a wide range of sizes. The average particle size is less than about 20 microns, usually less than about 10 microns, and typically about 3-5 microns. The dust contains predominantly alumina in various forms, preferably greater than about 95 wt % alumina. An organic binder is added to the alumina-containing dust to form a mixture. The organic binder is preferably starch or modified starch. Other suitable organic binders include carboxymethylcellulose, guar gum cellulose, lignin, and polyvinyl alcohol. The binder preferably makes up about 1-5 wt % of the mixture. After the mixture enters the drum, it is sprayed with water or other suitable fluid. The water is supplied by spray bars extending into the drum interior and having nozzles adjacent to the mixture. The water converts the mixture into granules which are formed as the mixture travels from the closed end to the open end of the drum. A rotor in the drum interior has rotating pins near the closed end. Back portions of the pins energize the dust particles so that they agglomerate more quickly into granules. Average residence time of the dust particles in the rotating drum is usually less than 1 minute, ideally about 20-30 seconds. Agglomerated granules made in accordance with the invention generally have an average particle size of 20 microns or more. Average particle size of the granules is more than twice the average particle size of the dust, preferably more than 5 times the average dust particle size.

Agglomerated granules made in accordance with the invention are suitable feedstock material for production of aluminum by electrolysis of alumina. Commercial aluminum production is carried out in a reduction cell by the Hall-Heroult process in which the alumina-containing granules are dissolved in molten cryolite maintained at a temperature of about 960-980° C. An electric current passing through the molten cryolite reduces alumina to aluminum which is collected in a pool beneath the molten bath. Electric current enters the cell through an anode in contact with the molten electrolyte, passes downward through the electrolyte, through the pool of molten aluminum, and into a cathode at the cell bottom. The current leaves the cell through a metal collector bar below the cell bottom and is then conducted to an anode in the next of a series of cells making up a pot line. Molten metal is removed from the cell periodically, preferably by breaking a solid crust over the electrolyte and inserting a vacuum tap.

4. BRIEF DESCRIPTION OF THE DRAWINGS

5. DETAILED DESCRIPTION OF A PREFERRED EMBODIMENT

Figure 1:
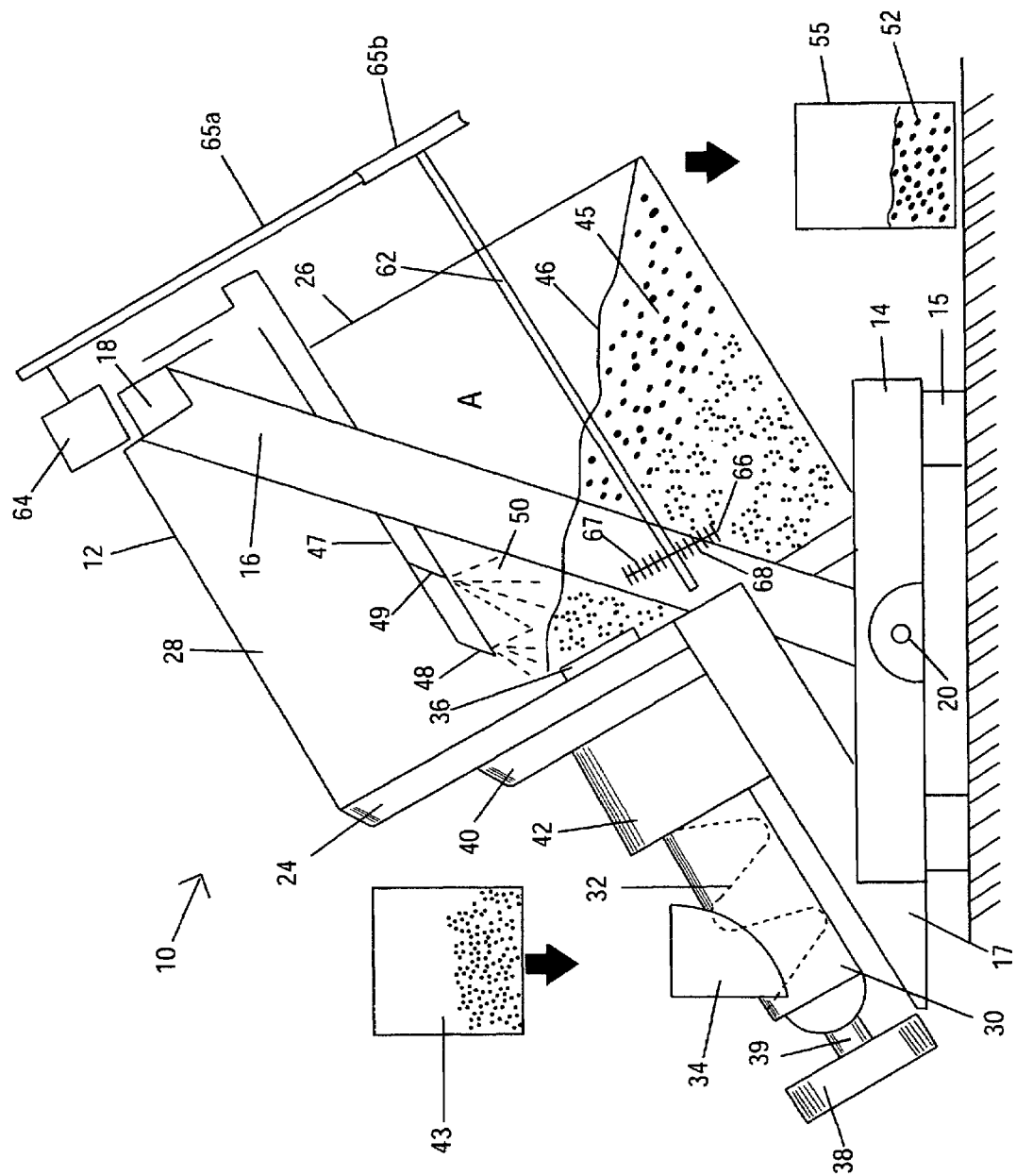
FIG. 1 is a schematic, side elevational view of a drum for agglomerating alumina-containing dust in accordance with the present invention.

A particularly preferred agglomerating apparatus 10 of the invention shown in FIG. 1 includes a rotating drum 12 mounted on a base 14 having legs 15. The base 14 also supports a frame including a pair of upwardly extending side beams 16, a motor platform 17, and a cross beam 18 extending between side beams 16 on opposite sides of the drum 12. The side beams 16 are connected with the base 14 by a pivot 20 allowing for angular rotation of the drum 12 relative to the base 14. The drum 12 has a closed end 24, an open end 26, and a side wall 28 between the closed end 24 and open end 26. The side wall 28 is cylindrical in the preferred embodiment shown. Alternatively the side wall 28 may be conical, with the closed end 24 larger than the open end 26.

A screw feeder 30 is mounted on the platform 17. The screw feeder 30 has a generally cylindrical outer housing and a helical auger 32 journalled inside the housing. The screw feeder 30 supports an upwardly extending feed trough 34 outside the drum 12 and has a delivery end 36 inside the drum 12 extending away from the motor platform 17. An electric motor 38 connected with gears 39 mounted on the platform provides rotation to the screw feeder 30. The feeder may be based upon a ram or a pump instead of the helical auger 32. The drum 12 is rotated around a principal axis A by a large ring gear 40 mounted on the closed end 24. The principal axis A extends between the closed end 24 and the open end 26, generally at the center of the cylindrical side wall 28. The ring gear 40 is powered by an electric motor (not shown) supported on the motor platform 17. Bearings 42 connect an outer surface of the screw feeder to the closed end 24 of the drum 12.

Referring still to FIG. 1, a dry mixture 43 of alumina-containing dust along with about 2.5 wt % starch is fed into the feeder trough 34, emerging through the delivery end 36 inside the drum 12. A particularly preferred starch is corn starch supplied by Redshift Technologies, Inc., of New York, N.Y., CAS Number 9005-25-8. The mixture inside the drum forms a particle bed 45 having a top surface 46. The cross bar 18 supports at least one spray bar 47 ending in nozzles 48, 49 spraying water 50 onto the top surface 46. The dust gradually agglomerates into granules 52 emerging through the open end 26 of the drum 12. The granules are delivered to a dryer 55 and then dried, preferably by gas heat. Additional details of a drum pelletizer having some similar features are revealed in Harbison U.S. Pat. No. 3,802,822, the disclosure of which is incorporated herein to the extent consistent with the present invention.

The agglomerating apparatus 10 of the invention also has a rotor 66 including a rotating shaft 62 connected with several pins submerged in the bed 45. The shaft 62 is powered by a motor 64, belt 65a, and pulley 65b, all outside the open end 26. The pins include front portions 67 near the closed end and back portions 68 extending toward the mixture. In operation, the screw feeder 30 delivers a dust/starch mixture through the closed end 24 of the drum 12 into the bed 45. Nozzles 48, 49 spray water down onto the top surface 46. Agglomerates rolling along the top surface 46 pick up smaller dust particles working their way through the bed 45. The pins 67, 68 energize the mixture, hastening agglomeration. Eventually, the larger granules fall over a bottom edge of the open end 26 into a dryer 55. At the end of a run the drum 12 is emptied by rotating the open end 26 of the drum 12 about the pivot 22. The agglomerating apparatus 10 of my invention is controlled by optimizing several variables—amount and composition of binder in the mixture; feed rate of the mixture; amount of water or other fluid sprayed onto the bed; rate of drum rotation; speed of rotation of the rotor; and angle of the drum axis as it is rotated. Controlling these variables allows the manufacturer to produce granules having optimal physical properties, including particle size distribution, bulk density, and strength, without changing the composition.

Figure 2:
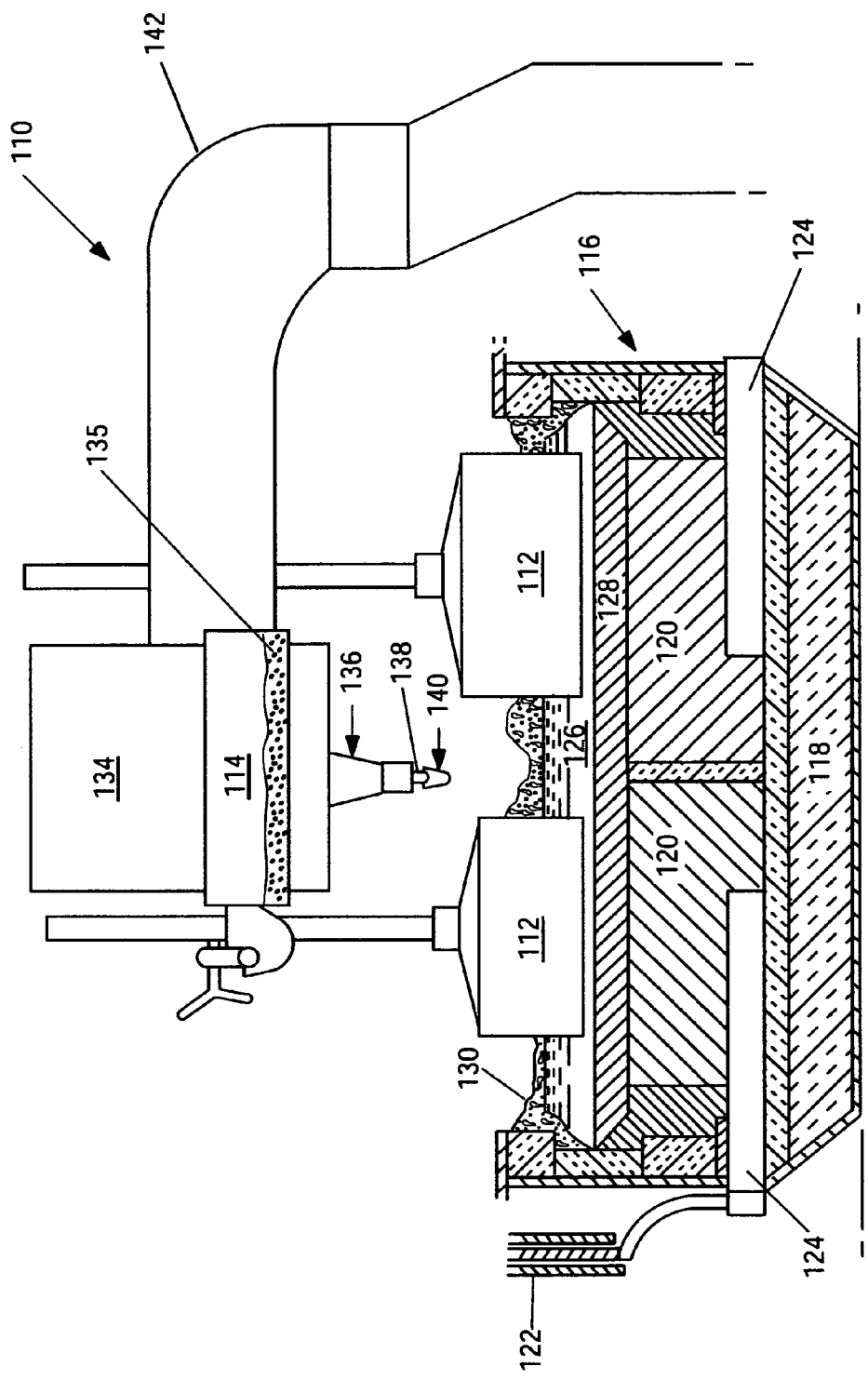
FIG. 2 is a schematic cross-sectional view of an electrolytic cell for producing aluminum from alumina-containing dust granules in accordance with the invention.

Referring now to FIG. 2, there is shown an electrolytic cell 110 for aluminum production, including carbon anodes 112 suspended from a movable bridge 114. The anodes 112 are situated above a pot or cell 116 lined with a layer of insulating material 118 upon which solid carbon blocks 120 are positioned. The carbon blocks are connected in an electrical circuit with an external bus 122 via steel conductor bars 124 passing through the cathode blocks 120. A molten salt bath 126 of cryolite containing dissolved alumina is maintained within the pot 116 above the bath's melting point, preferably approximately 950-960° C. As the alumina is reduced to aluminum, a molten metal pad 128 settles over the cathode blocks 120. A layer of crust 130 forms above the bath 126, surrounding the carbon anodes 112. The crust 130 has a thickness of several inches.

Referring again to FIG. 2, a movable bridge 114 is vertically adjustable to enable the carbon anodes 112 to be elevated or lowered relative to the height of the bath 126. An overhead hopper 134 supported between the carbon anodes 112 is filled with alumina ore 135. The ore 135 comprises granules made by agglomerating alumina-containing dust in accordance with the present invention, alone or in combination with smelting grade alumina (SGA). Ore 135 from the hopper 134 is periodically added to the bath 126 as needed through a feeder mechanism 136. The feeder mechanism 136 includes a downwardly projecting steel rod 138 supporting a ceramic plugger foot 140. When ore is added to the bath 126, the steel rod 138 and plugger foot 140 are thrust downwardly to punch a hole through the crust 130. An overhead conveyor 142 supplies ore 135 to the hopper 134 as needed. Tapping molten aluminum from the metal pad 128 requires breaking the crust 130 to insert a vacuum tap (not shown). In a typical modern Hall-Heroult electrolytic cell, molten aluminum is tapped approximately every 24 hours.

PARTS LIST

| | |
|---|---|
| 10 | Agglomerating apparatus |
| 12 | Drum |
| 14 | Base |
| 15 | Legs |
| 16 | Side beams |
| 17 | Motor platform |
| 18 | Cross beam |
| 20 | Pivot |
| 24 | Closed end |
| 26 | Open end |
| 28 | Side wall |
| 30 | Screw feeder |
| 32 | Auger |
| 34 | Feed trough |

-continued

| | |
|---|---|
| 36 | Delivery end |
| 38 | Electric motor |
| 39 | Gears |
| 40 | Ring gear |
| 42 | Bearings |
| 43 | Mixture |
| 45 | Bed |
| 46 | Top surface |
| 47 | Spray bar |
| 48, 49 | Nozzles |
| 50 | Water |
| 52 | Granules |
| 55 | Dryer |
| 62 | Shaft |
| 64 | Motor |
| 65a | Belt |
| 65b | Pulley |
| 66 | Rotor |
| 67 | Front portion |
| 68 | Back portion |
| 110 | Electrolytic cell |
| 112 | Anode |
| 114 | Bridge |
| 116 | Pot |
| 118 | Insulating material |
| 120 | Carbon blocks |
| 122 | Bus |
| 124 | Conductor bar |
| 126 | Bath |
| 128 | Pad |
| 130 | Crust |
| 134 | Hopper |
| 135 | Ore |
| 136 | Feeder mechanism |
| 138 | Steel rod |
| 140 | Plugger foot |
| 142 | Conveyor |

The foregoing detailed description of my invention has been provided with reference to one particularly preferred embodiment. Persons skilled in the art understand that numerous modifications can be made in my invention without materially departing from the spirit and scope of the following claims.

The invention claimed is:

1. An apparatus for agglomerating alumina-containing dust into granules having a larger average particle size than the dust, said apparatus comprising:
  (a) a drum having a closed end, an open end, and a side wall extending between said closed end and said open end, said drum: (i) rotating about a principal axis deviating from horizontal by an angle of about 50° or less; and (ii) adapted for receiving a mixture comprising alumina-containing dust and a binder;
  (b) an auger including a screw extending through said closed end of the drum, said screw adapted for feeding the mixture into said drum from other than a top side of said drum;
  (c) at least one spray nozzle for spraying water onto said mixture inside the drum, said water promoting agglomeration of the mixture into a plurality of granules;
  (d) rotating means for rotating said drum about said principal axis, thereby to agitate said mixture inside the drum; and
  (e) a rotor inside said drum, said rotor including pins hastening agglomeration of the mixture into granules, said pins rotating about a shaft extending generally parallel to said principal axis and said pins extending substantially parallel with said shaft.

2. The apparatus of claim 1 wherein each of said parallel extending pins includes a front portion that extends towards the closed end of the drum for mixture stirring purposes and aback portion that extends toward the open end of the drum.

3. A process for converting alumina-containing dust into granules having a larger average particle size than the dust, said process comprising:
  providing a mixture of the dust and a binder,
  feeding the mixture into the drum of the apparatus of claim 1,
  rotating the drum about its principal axis, spraying water onto a top surface of the mixture, stirring the mixture inside the drum with the parallel-extending pins on said rotor, agglomerating the dust into granules, removing from the drum granules that are larger in average particle size than the dust, and drying said granules.

4. The process of claim 3 wherein said binder comprises an organic substance selected from the group consisting of: corn starch, modified starch, and combinations thereof.

5. The process of claim 4 wherein said binder comprises about 1-5 wt % of the mixture.

6. The process of claim 3 wherein said mixture is fed into said drum by said auger.

7. The process of claim 3 wherein the average particle size of the granules is more than twice the average particle size of the dust.

8. The process of claim 3 wherein said granules have an average particle size of at least about 15 microns.

9. The process of claim 3 wherein said dust has an average particle size of less than about 10 microns.

10. The process of claim 3 wherein said dust comprises at least about 95 wt % alumina.

11. The process of claim 3 wherein said granules have an average residence time in said drum of about 1 minute or less.

* * * * *